Dec. 19, 1939.  E. WILDHABER  2,183,759
METHOD AND APPARATUS FOR GRINDING GEARS
Filed June 11, 1937  7 Sheets-Sheet 1
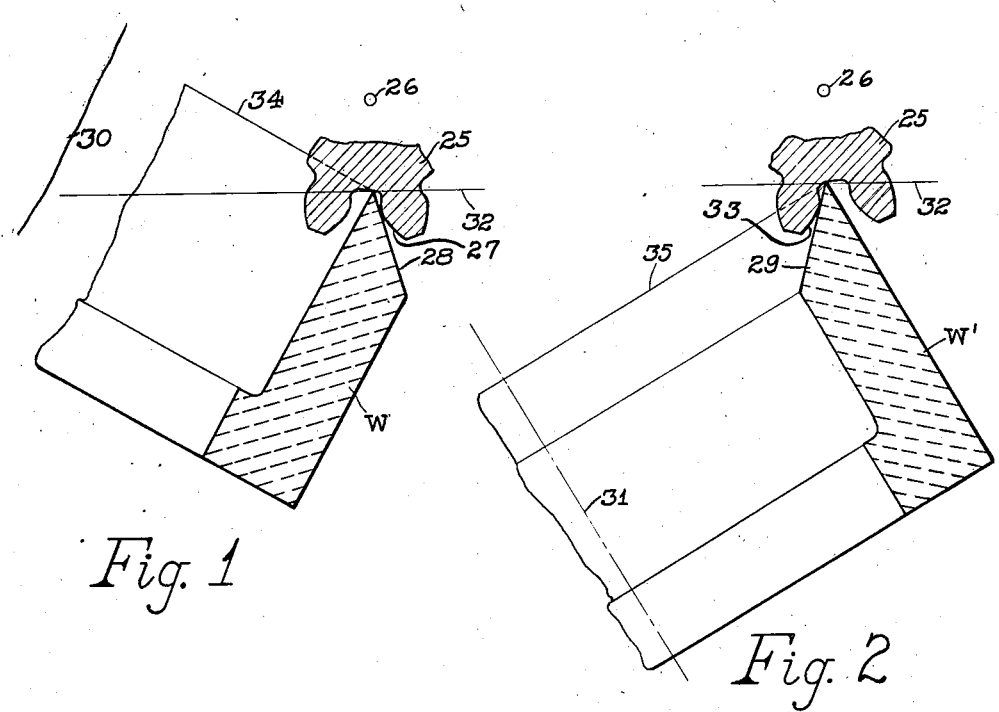
Fig. 1
Fig. 2
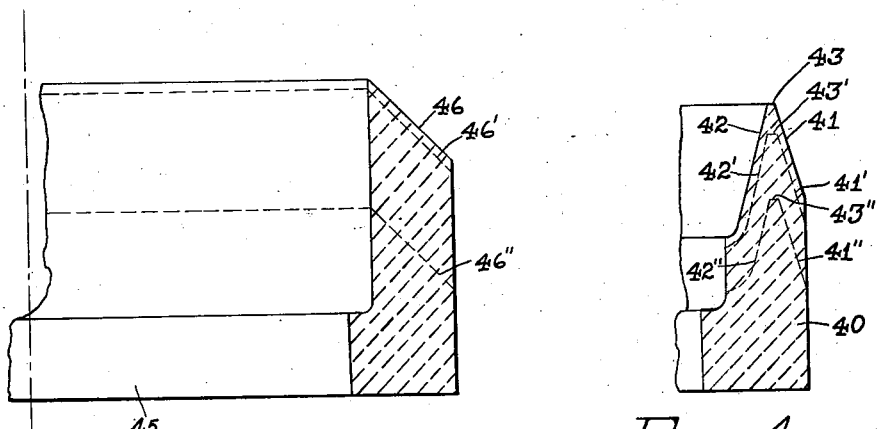
Fig. 3
Fig. 4
Ernest Wildhaber Inventor
By (signature)
Attorney Inventor
Ernest Wildhaber Inventor
Ernest Wildhaber Dec. 19, 1939.      E. WILDHABER      2,183,759
METHOD AND APPARATUS FOR GRINDING GEARS
Filed June 11, 1937      7 Sheets-Sheet 5
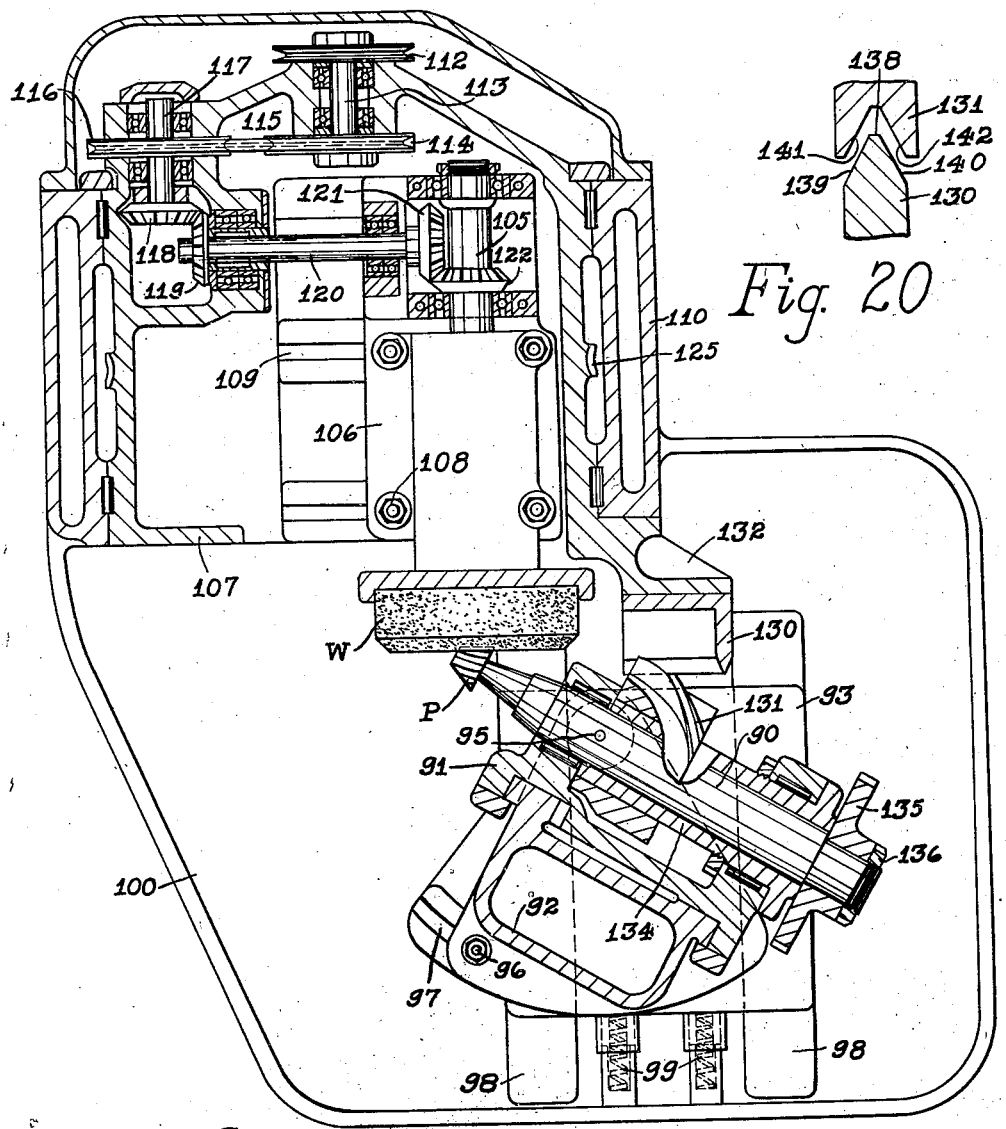
Fig. 20
Fig. 19
Fig. 18
Inventor
Ernest Wildhaber
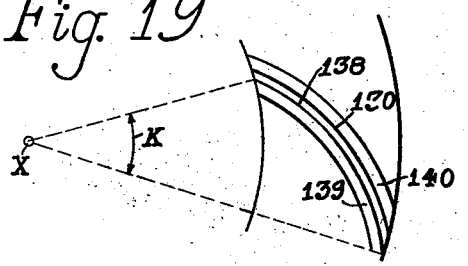
By
Attorney Inventor
Ernest Wildhaber Dec. 19, 1939.  E. WILDHABER  2,183,759
METHOD AND APPARATUS FOR GRINDING GEARS
Filed June 11, 1937  7 Sheets-Sheet 7

Inventor
Ernest Wildhaber
By
Attorney

Patented Dec. 19, 1939

2,183,759

UNITED STATES PATENT OFFICE 2,183,759

METHOD AND APPARATUS FOR GRINDING GEARS

Ernest Wildhaber, Irondequoit, N. Y., assignor to Gleason Works, Rochester, N. Y., a corporation of New York Application June 11, 1937, Serial No. 147,682

27 Claims. (Cl. 51—278)

The present invention relates to the grinding of gears and particularly to the grinding of longitudinally curved tooth gears such as spiral bevel and hypoid pinions.

A primary object of the invention is to provide a method for grinding spiral bevel and hypoid pinions which will permit the use of a grinding wheel that has a longer life than grinding wheels heretofore employed for the purpose, and which, thereby, will reduce the cost of the grinding wheel per pinion by enabling more pinions to be ground with a wheel. The cost of the grinding wheel is a substantial item of the total grinding cost and with the present method may be cut down to one half or even to one third of the cost hitherto prevailing.

Another object of the invention is to provide a method for grinding gears which will permit of simplifying the wheel-dressing operation and allow use of a much less complicated dressing mechanism than has heretofore been required for the dressing of wheels for grinding gears.

Still another object of the invention is to provide a method of grinding spiral bevel and hypoid pinions which will permit of obtaining in a very simple way any desired tooth bearing or contact between the pinion and its mate gear.

Still further objects of the invention are to provide a simple and inexpensive machine for effecting the desired grinding operation.

Other objects of the invention will be apparent hereinafter from the specification and from the recital of the appended claims.

In the drawings:

Figs. 1 and 2 are fragmentary normal sectional views illustrating, respectively, the grinding of opposite sides of the teeth of a spiral bevel or hypoid pinion according to the method of the present invention;

Fig. 3 is a fragmentary sectional view of a grinding wheel such as it is proposed to use with the present invention and indicating diagrammatically how such a wheel is dressed;

Fig. 4 is a corresponding view of a conventional type of grinding wheel such as has heretofore been used in the grinding of spiral bevel and hypoid pinions and indicating diagrammatically how such a wheel is dressed;

Fig. 18 is a plan view, with parts shown in section, of a grinding machine built according to one embodiment of this invention;

Fig. 19 is a diagrammatic view illustrating the construction of the abutment member which helps control the generating motion of this machine;

Fig. 20 is a sectional view showing the profile shapes of the abutment member and the cam which meshes therewith, the two members being shown slightly spaced apart for the purpose of clearness in illustration;

Figure 5:
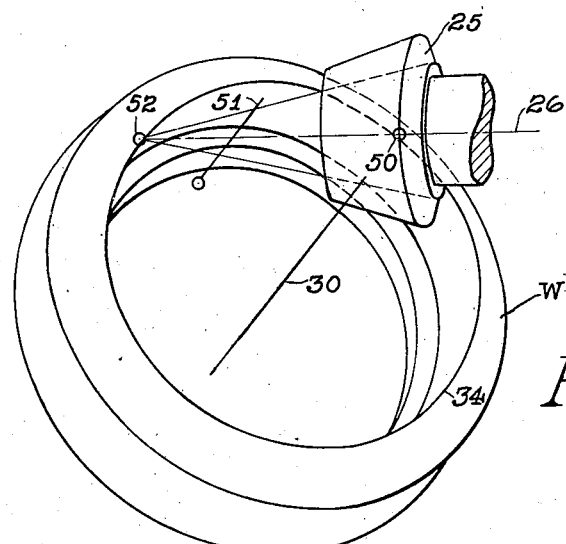
Fig. 5 is a view taken in the root plane of the pinion and illustrating diagrammatically the relative positions and motions of the pinion and grinding wheel in the grinding of the concave sides of the pinion teeth.

With the present invention, it is proposed to grind spiral bevel and hypoid pinions with an annular grinding wheel having an active surface of larger pressure angle, much larger than the pressure angle of the tooth surfaces to be ground on the pinion. Preferably, the pressure angle of the wheel will be in the neighborhood of 45°.

With such a wheel, the profile of the grinding surface may extend across the whole width of the tip surface of the wheel. One side of the pinion tooth is ground at a time and different wheels are employed in the grinding of the opposite side surface of the teeth. The grinding wheel used is adjusted into engagement with the pinion to be ground so that its active surface is inclined to the root plane of the pinion at an angle corresponding to the pressure angle of the tooth surfaces to be ground upon the pinion and the grinding operation is effected by rotating the wheel on its axis in engagement with the pinion and effecting a relative rolling movement between the wheel and pinion while producing a relative movement between the wheel and pinion in the direction of the axis about which the rolling motion takes place. Preferably this axis will be parallel to the wheel axis. The movement in the direction of this axis may be at either a variable or at a uniform velocity.

As stated, for the grinding of opposite sides of the pinion teeth, different wheels are employed and the wheels are tilted in opposite directions in order to incline their active grinding surfaces, respectively, at an angle to produce the desired pressure angles on the tooth surfaces of the pinion. The relative movement between wheel and pinion in the direction of the axis of roll is for the purpose of causing the wheel to follow the bottom of a tooth space of the pinion during the rolling motion and thereby grind each tooth surface of the pinion to the desired depth throughout its length.

The grinding wheel employed may have its active surface dressed to a straight profile, as is common practice, but it is also within the contemplation of the present invention to dress the grinding wheel to a curved profile. In fact, one of the features of the present invention is the control over the tooth bearing or contact between a spiral bevel or hypoid pinion and its mate gear which it has been discovered is possible by dressing the grinding wheel to a curved profile. This profile may be either concave or convex and may be either a circular arc or a curve of variable curvature, the type and shape of curve being determined by the modification which it is desired to effect in the tooth bearing or contact.

Reference will now be had to the drawings for a more detailed description of the invention. In Figs. 1 and 2, 25 indicates a spiral bevel or hypoid pinion, which is here shown fragmentarily and in normal section, and 26 is the axis of this pinion. In Fig. 1, a grinding wheel W is shown in engagement with the pinion for grinding the concave sides 27 of the pinion teeth and in Fig. 2 a grinding wheel W is shown in engagement with the pinion for grinding the convex sides 33 of the teeth. The grinding wheels W and W' are annular wheels of the general type illustrated in the United States patent to James E. Gleason et al. No. 1,612,371 of December 28, 1926.

The wheel W grinds with its outside surface 28 while the wheel W' grinds with its inside surface 29. The outside surface 28 of the wheel W is inclined at a very considerable angle to the axis 30 of this wheel, at an angle of about 45°, while the inside surface 29 of the wheel W' is also inclined at a very large angle to its axis 31, the angle again being about 45°. As a result, the grinding surfaces 28 and 29, respectively, may occupy the whole width of the tips of their respective wheels, as is illustrated in Figs. 1 and 2.

In the grinding of the tooth surfaces of the pinion, the grinding wheel used is adjusted so that its active surface is inclined to the root plane 32 of the pinion at an angle corresponding to the pressure angle of the tooth surfaces to be ground. This requires that the axes of the grinding wheels can be tilted in opposite directions relative to the pinion for the grinding of the opposite sides of the pinion teeth, as is shown in Figs. 1 and 2. On account of this opposite tilt and for other reasons, it is inadvisable to use the conventional generating motions in the grinding of the pinion. The grinding wheel W would grind too deep at the ends of the teeth of the pinion, as is apparent from the position of its tip circle 34 and the grinding wheel W would grind too shallow at the ends of the teeth, as is apparent from the position of its tip circle 35. A new and special method of generation is therefore required in order to generate the tooth surfaces of the pinion, as will be described more fully hereinafter. One side only of the pinion teeth is ground at a time, of course, but this follows conventional practice.

The conventional type of spiral bevel or hypoid pinion grinding wheel has a V-shaped grinding contour. If it is to grind on one side only, that side of the wheel will be inclined to the axis of the wheel at an angle equal to the pressure angle of the tooth surface to be ground and the opposite side surface, which is the clearance side, may be inclined at any appropriate angle, usually slightly smaller than the active side. If the wheel is to be used to grind successively the opposite sides of the teeth of a pinion, its inside and outside surfaces are inclined to the axis of the wheel at angles corresponding to the tooth surfaces to be ground upon the pinion. A conventional type of grinding wheel is shown at 40 in Fig. 4. Here, the outside and inside surfaces 41 and 42 of the wheel are inclined to the axis of the wheel at the pressure angle of the tooth surfaces to be ground on the pinion. When such a wheel is dressed, it is necessary to dress the two side surfaces and the tip surface 43 of the wheel. The dotted lines 41', 43', 42', indicate the outlines of the wheel 40 after it has been dressed back.

With a wheel such as is employed in the present invention and such as shown at 45 in Fig. 3, however, it is only necessary to dress the grinding wheel back along its active surface. 46 denotes the active surface of the grinding wheel 45 prior to dressing and 46' denotes the position of the active surface after a dressing.

It will be noted that on account of the small inclination or pressure angle of the grinding surface 41 of the wheel 40, this wheel must be advanced axially very much more than the wheel 45 to dress off the same thickness of grinding material. The wheel 45, therefore, will stand many more dressings than the conventional wheel 40. The lines 41'', 43'', 42'' denote the outlines of the grinding wheel 40 when it is substantially used up while the line 46'' denotes the position of the active surface of the wheel 45 when this wheel is substantially used up. It is evident that the life of the wheel 45 is more than double the life of the conventional wheel which must be dressed also on its clearance side and on the top although it does not grind there.

The wheel shown in Fig. 3 is for grinding the concave sides of the pinion teeth. A saving in wheel cost corresponding to that shown for this wheel is also obtainable for the wheel which grinds the convex sides of the pinion teeth, as will be obvious.

Aside from the saving in wheel cost, which is possible with the present invention, the operation of dressing the wheel is made simpler. With a wheel such as the wheel W or the wheel W', it is often sufficient to dress the grinding profile only whereas on the conventional wheel, as stated, the top and clearance sides must be dressed as well as the active side of the wheel. Of course, a little top land could be dressed on the wheels W and W' if so desired. This is believed to be unnecessary, however, on account of the large included angle (45°), at least when the pinion teeth are so designed and cut that the very tip of the wheel is relieved of any grinding burden. In any case, there is less dressing required for a wheel used in the method of the present invention than for conventional wheels and accordingly, the dressing mechanism may be simplified and the cost of same reduced.

Figure 6:
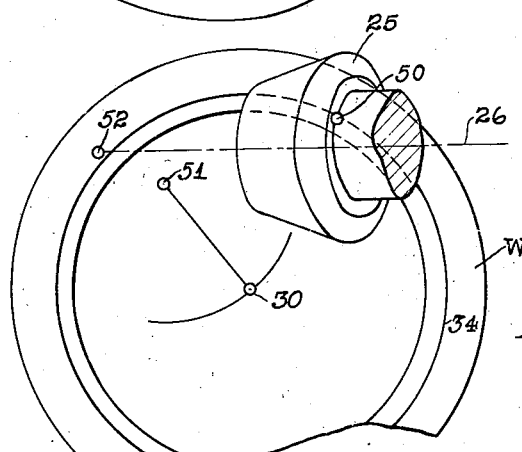
Fig. 6 is a corresponding view, looking in the direction of the axis about which the rolling motion takes place in the generation of the tooth surfaces of the pinion.
Figure 7:
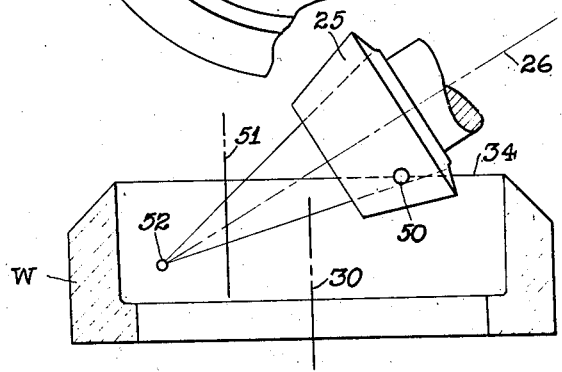
Fig. 7 is a corresponding front elevation, the wheel being shown in section.
Figure 8:
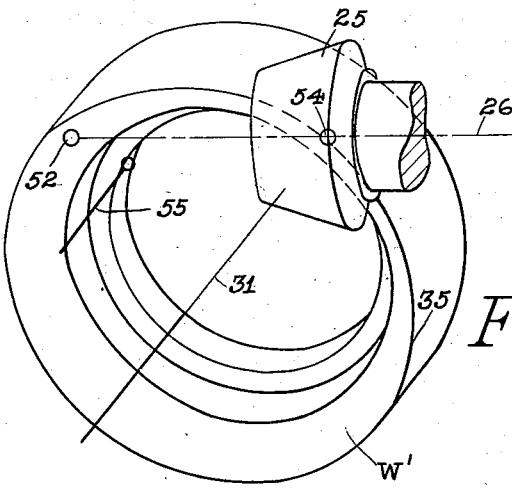
Figs. 8, 9 and 10 are views corresponding, respectively, to the views of Figs. 5, 6 and 7 and illustrating diagrammatically the positions and motions of the wheel and pinion in the grinding of the convex sides of the pinion teeth.
Figure 9:
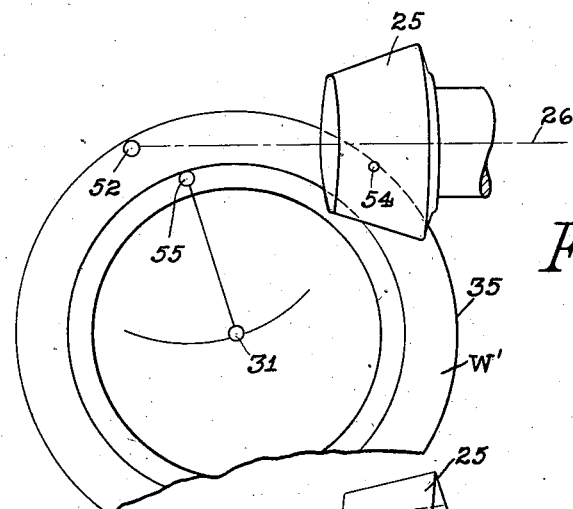
Figure 10:
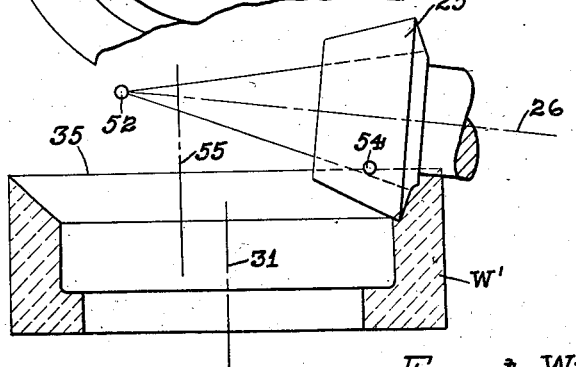

The generating method of the present invention is illustrated in Figs. 5 to 7 inclusive for the grinding of the concave sides of the teeth of the pinion and in Figs. 8 to 10 inclusive for the grinding of the convex sides of this pinion.

In the grinding of the concave sides of the pinion teeth, the grinding wheel W is positioned so that its axis 30 is inclined to the root plane of the pinion in the manner outlined with reference to Fig. 1. In the mean position shown in Figs. 5, 6 and 7, the tip circle 34 of the grinding wheel is tangent to the root cone of the pinion at a mean point 50. In the grinding operation, the wheel is rotated on its axis 30 in engagement with the pinion and the generating operation is effected by rotating the pinion on its axis 26 and simultaneously producing a relative rotational movement between the wheel and the pinion about an axis 51 which is preferably parallel to the axis 30 of the wheel. In addition, a simultaneous relative motion is produced between the wheel and pinion in the direction of the axis 51 such that the top circle 34 of the wheel will continuously contact or follow the root surface of the pinion as the pinion rotates on its axis and moves relatively about the axis 51. It is not necessary nor desirable that the top circle 34 of the wheel should have actual grinding contact with the root surface of the pinion and it is only required that the top circle of the wheel closely follow said surface.

The relative motion of the wheel with respect to the pinion is approximately a helicoidal motion. It may be an exact helicoidal motion of constant lead or it may be a motion such that the top circle of the wheel exactly follows the desired conical root surface of the pinion. The axis 51 about and in the direction of which the generating motion takes place is usually offset from the apex 52 of the pinion and, in the instance shown, is also offset from the axis 26 of the pinion.

The grinding of the convex sides of the pinion teeth is effected in a manner similar to the grinding of the concave sides of the teeth. The grinding wheel is inclined so that its axis 31 is inclined to the root plane of the pinion according to the principles outlined with reference to Fig. 2 and so that in the mean position shown in Figs. 8 to 10 inclusive, the tip circle 35 of the grinding wheel is tangent to the root cone of the pinion at a mean point 54 along the length of a tooth surface of the pinion. The grinding is effected by rotating the wheel W' on its axis while rotating the pinion on its axis 26 and simultaneously producing a relative movement between the wheel and pinion about and in the direction of an axis 55, which is preferably parallel to the wheel axis 31.

In the case of the grinding of both the concave and convex surfaces of the pinion teeth, after one tooth surface has been ground, the wheel is withdrawn relatively from engagement with the pinion and the pinion is indexed, and then the wheel is brought back into engagement with the pinion to grind a new tooth surface. So the operation proceeds until all of the tooth surfaces on one side of the pinion have been ground. Separate machines may be employed for the grinding of opposite sides of the pinion teeth or the same machine may be used for grinding the opposite sides of the teeth successively by simply changing wheels and adjustment.

To obtain the best results with the present invention, it is desirable to employ a dressing mechanism with which the grinding wheel profile can be dressed to a flat curve. In other words, a dressing device should be used which will enable the wheel to be dressed to a straight profile or to a slightly convex or to a slightly concave profile, as may be desired. This will enable the wheel to be dressed so as to avoid a tooth bearing condition where the profile bearing is wide at one end of the pinion teeth and narrow at the other end when the pinion is run in mesh with its mate gear. For this reason, it is preferred to use a dressing mechanism such as illustrated diagrammatically in Figs. 13, 14 and 15 in which the dressing tool is swung in a circular arc to effect the dressing operation.

In the dressing mechanism shown, the dressing diamond is mounted upon a slide 60 that is radially adjustable on an arm 61 which is mounted in a bracket or support 62 for swinging movement about an axis 63. The dressing mechanism may be hand actuated as by means of the lever 64 or it may be actuated in any other suitable manner.

With such a dressing mechanism, to obtain a straight grinding profile on the grinding wheel, the diamond is moved in a circular arc in the general direction of the generatrix of the desired conical grinding surface of the wheel and so that the plane of said circular arc is tangent to said conical grinding surface.

Figure 11:
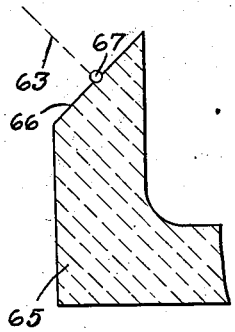
Figs. 11, 12 and 13 are, respectively, a fragmentary sectional view of a grinding wheel, a view looking at the active surface of this wheel, and a sectional view of the wheel at a mean point of its surface, and illustrating one way of dressing a grinding wheel for use in the present invention.
Figure 12:
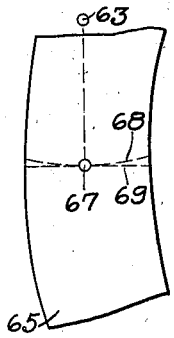
Figure 13:
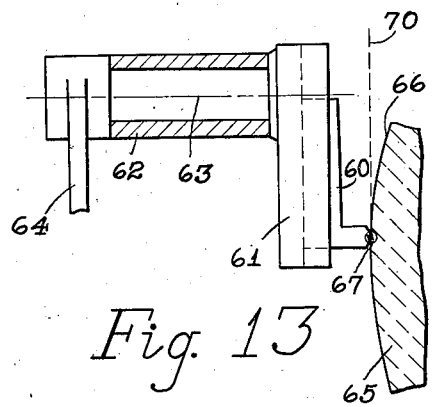

This arrangement is illustrated in Figs. 11 to 13 inclusive. Here the dressing mechanism is so positioned with reference to the grinding wheel 65 that the axis 63 of swing of the dressing diamond is perpendicular to a plane tangent to the conical active grinding surface 66 of the wheel at a mean point 67 in such surface. The point 67 is preferably a point corresponding to a point midway the height of the profile of the pinion tooth surfaces to be ground. With this arrangement of the dresser, the path of the diamond as it is swung about the axis 63 is a circular arc 68 which is tangent to a generatrix 69 of the grinding surface 65 at the mean point 67 and which, therefore, extends in the general direction of the generatrix 69. The plane of the circular arc 68 is identical with the plane 70 tangential to the conical grinding surface 66 at the mean point 67, see Fig. 13. It can readily be demonstrated that the grinding profile produced on the grinding wheel 65 by a dressing mechanism such as shown when the dressing mechanism is positioned in the manner illustrated in Figs. 11 to 13 inclusive departs from a straight line by amounts which are entirely negligible and that to all intents and purposes, the grinding wheel has a straight profile.

Figure 14:
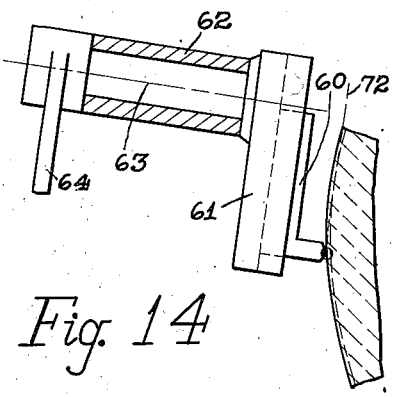
Fig. 14 is a diagrammatic view illustrating how a convex profile may be dressed on the grinding wheel by tilting the dressing mechanism.

A convex grinding profile may be dressed upon the grinding wheel when the dresser is tilted about the generatrix 69 of the grinding surface to a position, such as indicated in Fig. 14, where the axis 63 of swing of the diamond is inclined at other than a right angle to a plane tangent to the active grinding surface of the wheel. The circle 72 along which the diamond then swings, which is projected as a straight line in Fig. 14, reaches inside of the tangential plane and the wheel will accordingly be dressed to a convex profile.

Figure 15:
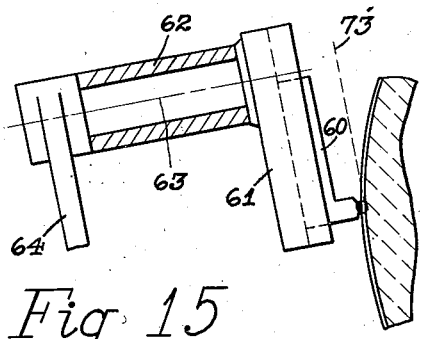
Fig. 15 is a diagrammatic view illustrating how a concave profile may be produced on the grinding wheel.

Similarly, a concave grinding profile may be obtained when the dressing mechanism is tilted in the opposite direction about the generatrix 69 to a position such as shown in Fig. 15. In this case, the circle of swing of the diamond, which appears in this figure as a straight line at 73, recedes from the plane tangent to the active surface of the grinding wheel at the sides of the grinding wheel.

The grinding profiles produced upon the wheel in the method illustrated in Figs. 14 and 15 are circular arcs or more precisely curves which do not differ measurably from circular arcs.

Figure 16:
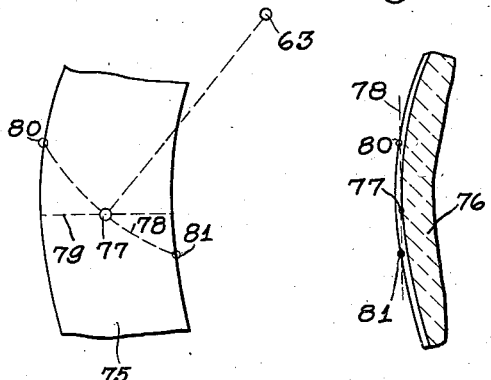
Figs. 16 and 17 are, respectively, a fragmentary view looking at the grinding surface of the wheel and a fragmentary section through the wheel taken at a mean point of contact between the wheel and the dressing mechanism and illustrating diagrammatically how a profile of varying curvature may be dressed upon the wheel.
Figure 17:
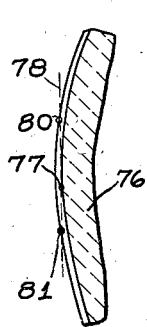

Figs. 16 and 17 illustrate a way of producing a grinding profile of varying curvature on an annular grinding wheel. Here the dressing mechanism is positioned so that the axis 63 of swing of the diamond is perpendicular to a plane tangent to the grinding surface 75 of the grinding wheel 76 at a mean point 77, but, in this case, the dressing mechanism is so positioned also that the arc 78 in which the dresser moves extends obliquely to a generatrix 79 of the grinding surface. Since the end points 80 and 81 of the circular arc lie in the tangential plane but away from the line 79 of tangency of this plane with the conical surface of the grinding wheel, they are outside of said surface. Additional stock will therefore be left on the inside and outside of the grinding surface 75 so that a concave grinding profile will be produced. The point 80 of the arc 78 is at a greater distance from the generatrix 79 than the point 81 and therefore the grinding profile produced is not symmetrical with respect to the mean point 77.

By inclining the axis of the grinding wheel in one direction or the other with reference to the tangential plane while maintaining the position of the axis so that the arc of travel of the diamond is inclined to a generatrix of the grinding surface, a convex profile or a profile of further modified curvature may be produced on the grinding wheel.

By the control over the grinding wheel curvature provided through use of a dressing mechanism such as described, it is possible to control the bearing or tooth surface contact which the pinion has with its mate gear when the pair are run in mesh. For instance, if, after a pinion has been ground with computed settings and the computed motions, it is found that such a pinion meshes with its mate gear with an "arrow-head" bearing, that is, with a bearing which narrows toward one end of the pinion tooth and at the opposite end of the tooth is heavy toward the tip and toward the root of the tooth but fades out or is lacking entirely near the pitch line of the tooth, the presence of such a bearing indicates the desirability of using a grinding wheel of curved grinding profile. Where the point of the "arrow head" bearing is directed toward the small end of the gear tooth, it has been found that if the grinding wheel is dressed with a slightly concave profile, this bearing condition can be eliminated and a full length, full profile bearing can be obtained. Likewise, if the point of the "arrow head" is directed toward the large end of the pinion tooth, it has been found that a full length, full profile bearing can be obtained by use of a grinding wheel having a slightly convex profile.

Various other uses of grinding wheels having curved profiles will suggest themselves to those skilled in the art. But with a curved profile grinding wheel, it is possible to eliminate a "diamond" bearing, a "half-moon" bearing, etc.

For a dressing mechanism of the character described, it is sufficient to provide one angular adjustment of the dressing tool to permit inclining the axis of swing of the dresser to the axis of the grinding wheel, if linear adjustments are also provided.

One form of machine for grinding gears according to the present invention is illustrated in Fig. 18. The pinion P to be ground is secured to the work spindle 90 of this machine. This spindle is journaled in suitable bearings formed in a head 91 which is adjustable vertically upon a column 92. The column 92 is mounted for angular adjustment upon a slide 93. The angular adjustment is about an axis 95 and is for the purpose of adjusting the pinion in accordance with its root angle. The column 92 may be secured to the slide 93, after adjustment, by bolts 96 whose heads engage in an arcuate T-slot 97 that is formed in the upper face of the slide 93 concentric with the center 95 about which the column adjusts.

The slide 93 is mounted to reciprocate on ways 98 formed on the upper face of the base or frame of the machine and the slide is constantly urged inwardly toward the grinding wheel by coil springs 99 which are suitably housed in the base or frame 100 of the machine and act against the slide.

The grinding wheel is secured in any suitable manner to a spindle 105. This spindle is journaled by means of anti-friction bearings in a carrier 106 that is mounted for radial adjustment in a circular cradle 107. The carrier is secured in any position of its adjustment by bolts 108 whose heads engage in T-slots 109 formed on the cradle. The cradle 107 is mounted upon anti-friction bearings in a column or upright 110 which is integral with the base or frame 100 of the machine.

The grinding wheel is driven from a motor or other suitable source of power (not shown) through a pulley 112, shaft 113, pulley 114, belt 115, pulley 116, shaft 117, bevel gears 118 and 119, splined shaft 120, and bevel gears 121 and 122. In the preferred construction, the axis of the cradle is parallel to the axis of the grinding wheel spindle 105. The cradle is driven from any suitable source of power (not shown) through a worm wheel 125.

The slide 93 moves on the ways 98 in the direction of the axis of the cradle and during rotation of the cradle, the pinion being ground is rotated on its axis and simultaneously moved in the direction of the axis of the cradle. These two motions, namely, rotation of the pinion on its axis and movement in the direction of the axis of the cradle are produced and controlled in the machine shown in Fig. 18 by an arcuate shaped abutment member 130 and a master toothed member 131 which meshes with the arcuate abutment member 130. The member 130 is secured in any suitable manner to an arm or horn 132 which is integral with the cradle 107. The master 131 is keyed or fastened in any other suitable manner to a sleeve 134 in which the work spindle 90 is journaled and which is connected to the work spindle during grinding by the index mechanism of the machine. This index mechanism may be of any suitable type and is not shown in detail. For the sake of illustration, a notched index plate 135 is shown keyed to the work spindle 90 and secured against axial movement relative thereto by a nut 136. The connection between the sleeve 134 and the index plate 135 may be through any suitable form of notched plate index mechanism.

The arcuate member or abutment 130 is preferably formed so that its operating portions constitute segments of surfaces of revolution. It represents a single tooth or tooth space of ample spiral angle and has preferably the shape of a portion of a face-mill gear cutter. The master 131 comprises a tooth space capable of meshing with said tooth or abutment 130 in such a way that the predetermined rotary and translatory motions are imparted to the pinion to be ground as the master rotates in mesh with the abutment.

The general shape of the abutment tooth is illustrated in Fig. 19. The tooth is mounted concentric with the axis X of the cradle and its pitch line overlap K is above 30°. The tooth has a flat top 138 and conical side surfaces 139 and 140. The abutment may be the same on various jobs, but its position lengthwise of the cradle axis X may vary.

The master, as shown in Figs. 18 and 20, fits the tooth or abutment 130 in a manner to permit the predetermined motions. It constitutes a tooth space which meshes with the tooth 130. Its side profiles 141 and 142 are slightly convex. In practice, the master tooth space may be cut with a face-mill gear cutter on a conventional form of spiral bevel gear generator provided with means for moving the work or the gear cutter axially of the cradle during the generating motion. The movement axially of the cradle may be at a uniform velocity and in this event the settings for cutting the tooth space of the master may be different from the settings for grinding the pinion.

In setting up the machine to grind a pinion, the adjustment of the wheel for spiral angle of the work may be effected by radial adjustment of the carrier 106 and rotation of the cradle 107. The work will be adjusted angularly about the axis 95 in accordance with its pitch cone angle. The inclination of the active surface of the wheel relative to the work in order to grind the correct pressure angle on the work may be effected by varying the angular adjustment of the work and the wheel settings in accordance with well-known principles. This is preferred because thereby the axis of the wheel may be maintained parallel to the axis of the cradle and the machine construction simplified. If a hypoid pinion is to be ground, the work head 91 will be adjusted on the column 92 to offset the axis of the pinion from the axis of the cradle. The hand of the abutment 130 and the hand and shape of the master 131 will be determined by the hand and dimensions of the pinion to be ground.

The grinding of the tooth surfaces of the pinion are effected, then, by rotating the grinding wheel on its axis and simultaneously rotating the cradle 107 on its axis and this last motion is transmitted through the abutment 130 and master 131 to the work to rotate the work spindle 90 on its axis and simultaneously move the slide 93 back and forth axially of the cradle. After one side of a tooth of a pinion has been ground, the work is withdrawn and indexed and then is returned into engagement with the grinding wheel to grind a new tooth surface. After all of the teeth of the pinion have been ground on one side, the wheel may be changed and the opposite sides of the teeth may be ground on the same machine or the opposite sides of the teeth may be ground upon another machine.

No special feed and withdrawal mechanism has been provided in the machine illustrated in Fig. 18. These motions may be effected by extended roll of wheel and work or in any other suitable manner. The dressing mechanism has been omitted from Fig. 18 for the sake of clearness in illustration.

In the machine described, the motion imparted to the slide 93 under actuation of the abutment 130 and master 131 will be at a varying velocity. If a true helicoidal motion is desired for structural convenience, it is preferably imparted wholly to the grinding wheel where the axial motion may most easily be derived from the rotation of the cradle. The pinion will then simply rotate on a stationary axis and not move in and out. A machine built according to such an embodiment of the invention is illustrated diagrammatically in Figs. 21 to 23 inclusive.

In this machine, the pinion P', which is to be ground, is secured in any suitable manner to the work spindle 150. This spindle is journaled in a sleeve 151 which is journaled on anti-friction bearings in the slide 152 that is adjustable vertically upon a column or upright 154. The column or upright 154 is adjustable angularly about an axis 155 upon a plate 156. The column is secured in any position of its angular position by bolts 158 which engage in an arcuate slot 159 formed in the plate 156 concentric with the axis 155.

The plate 156 is adjustable rectilinearly on a base 160 and this base is mounted on the frame or bed 162 of the machine for rectilinear adjustment in a direction at right angles to the direction of adjustment of the plate 156. The plate 156 is secured to the base 160 in any position of its adjustment by T-bolts 164 which engage in T-slots 165 and the base 160 is secured in any position of its adjustment by T-bolts 166 which engage in T-slots 167 formed on the upper face of the bed 162 of the machine.

The grinding wheel W is secured in any suitable manner to the wheel spindle 170 which is journaled in a cradle 171 whose axis is parallel to the axis of the wheel spindle. The cradle 171 is mounted for rotary and axial movement in a column or upright 172 which is integral with the bed 162 of the machine.

Figure 23:
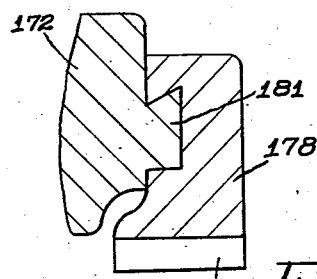
Fig. 23 is a section on the line 23—23 of Fig. 22.

The cradle is oscillated by means of a crank 175, and a connecting rod 176. The connecting rod is pivotally connected by means of a pin 177 to a generally arcuate shaped plate 178 which is slidable on arcuate guides 180 and 181 which are integral with the column or upright 172 in which the cradle 171 is journaled. The guides 180 and 181 are of generally dovetailed section, as shown in Fig. 23, to engage correspondingly shaped arcuate recesses formed in the plate 178.

The plate 178 is formed with two spaced internal gear segments 182 and 183 which mesh, respectively, with spur gear segments 184 and 185 that are formed on the periphery of the cradle 171. Hence, as the plate 178 is moved back and forth by the crank 175, the cradle is oscillated on its axis. The segments 182 and 183 have elongated teeth so as to maintain mesh with the segments 184 and 185 during the axial movement of the cradle.

During its oscillatory movement, the cradle is also moved axially back and forth. This motion is produced by a helical guide member or screw 190 which is coaxial of the cradle axis and which is secured to the back end of the cradle by screws 192. The screw 190 threads into an internal helical guide member or nut 193 which is secured in any suitable manner to a worm wheel 194. This worm wheel 194 is rotatably mounted upon a suitable bearing formed on the upright 172. A worm 195 meshes with this worm wheel.

During the generating grinding of the sides of the pinion teeth, the worm 195 is stationary and by its self-locking engagement with the worm wheel 194 holds the nut 193 stationary so that as the cradle 171 rotates on its axis, the screw 190 threads through the stationary nut 193 and causes an axial movement of the cradle. The screw 190 has a true helical thread and therefore the motion imparted to the cradle is a uniform axial motion which combines with a uniform rotary motion of the cradle to impart a true helicoidal motion to the grinding wheel.

The plate 178 carries an arcuate follower 200 which has conical operating surfaces 201. The follower 200 meshes with a master 202 which is keyed or otherwise secured to the sleeve 151. The master 202 is, in this instance, formed to produce simply a rotary motion of the work spindle as it is rotated by the follower 200.

The sleeve 151 is connected to the work spindle 150 to transmit the rotation of the master 202 to the work spindle through an indexing mechanism which may be of any suitable type and which, in the instance shown includes a notched index plate 205 which is keyed or otherwise secured to the work spindle and which is held against axial movement by a nut 206 that threads on the work spindle.

Figure 21:
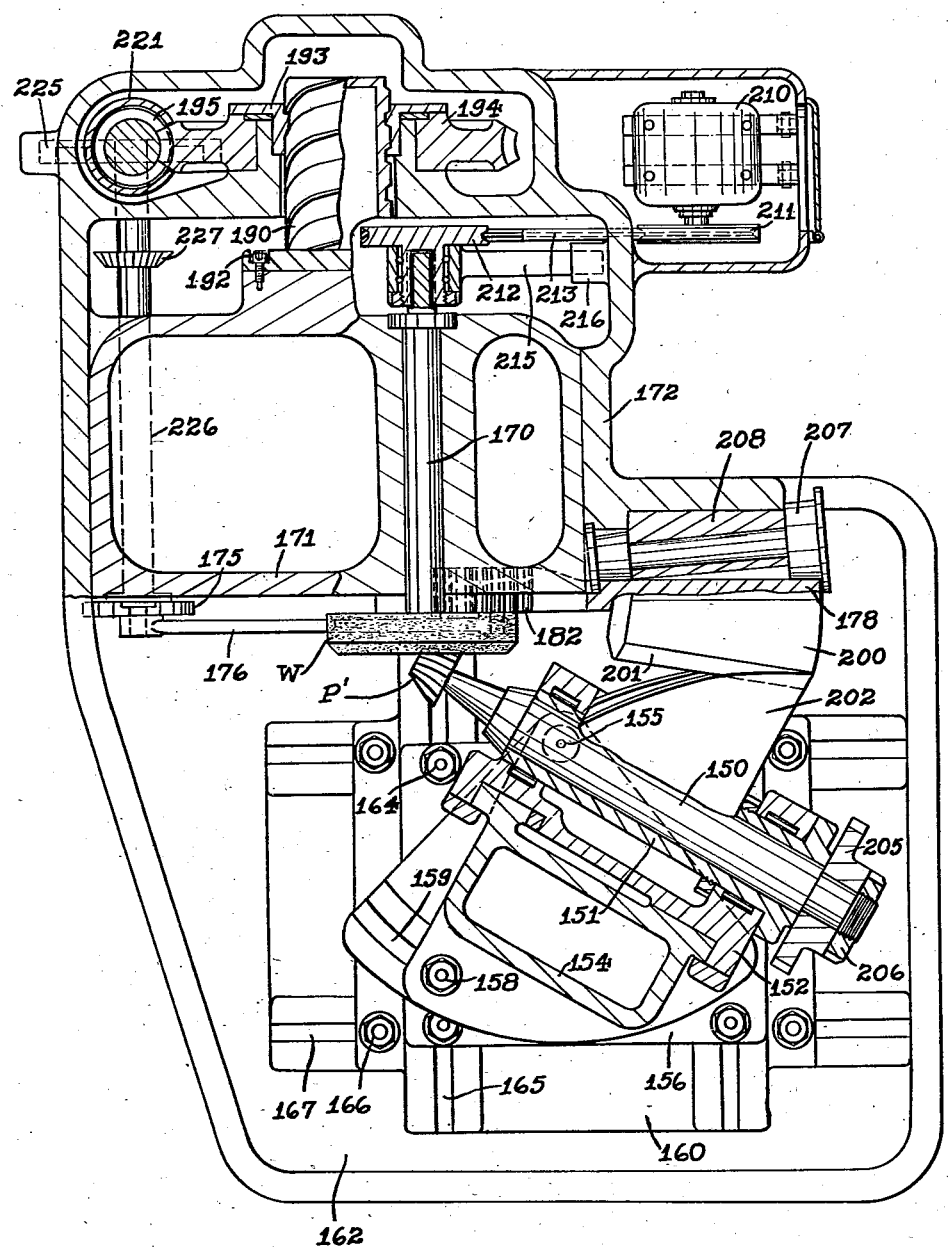
Fig. 21 is a plan view, with parts shown in section, of a machine built according to a different embodiment of the invention.
Figure 22:
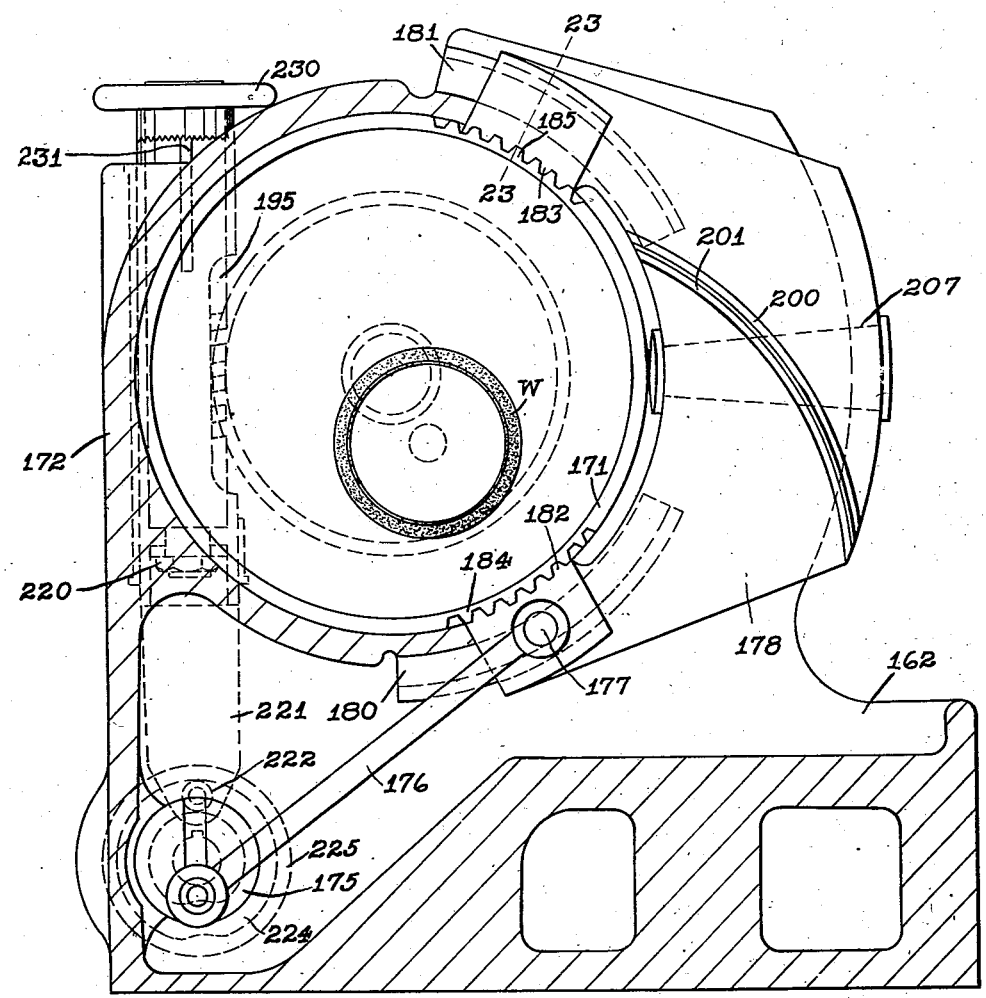
Fig. 22 is a vertical sectional view through this machine, looking at the wheel end of the machine.

The machine of Fig. 21 is shown arranged for grinding a pinion P' of opposite hand from the pinion P which is shown being ground on the machine of Fig. 18.

To support the plate 178 more rigidly and at the same time permit easy movement of this plate under actuation of the crank, 175, a tapered roller bearing 207 is provided. This bearing is of large size and is formed with bearing portions at both ends and is mounted between its ends in a bearing 208 that is secured to the column 172. The roller 207 provides a support for the plate between the guideways 180 and 181.

The grinding wheel spindle 170 is driven from a motor 210 through pulleys 211 and 212 and the belting 213. The pulley 212 has a splined connection with the grinding wheel spindle 170 but is held against axial movement with the spindle by an arm 215 which is fixed at one end in a lug 216 that is formed on the upright or column 172.

The various adjustments provided for the work permit of adjustment of the wheel relative to the work in accordance with the spiral angle, pressure angle and pitch cone angle of the pinion to be ground and also in accordance with the type of pinion to be produced, spiral bevel or hypoid. During grinding of the teeth of the pinion P', the grinding wheel W rotates in engagement with the pinion and the cradle 171 is rotated on its axis and simultaneously moved axially, through engagement of the screw 190 with the nut 193 and, at the same time, the work is rotated on its axis through operation of the follower 200 and master 202. When a tooth surface of the pinion has been ground, the grinding wheel is withdrawn from operative relation with the pinion and the work spindle is indexed and then the grinding wheel is fed back into engagement with the pinion and a new tooth surface is ground. When one side of all of the teeth have been ground, the wheel W may be removed and replaced by another wheel W' for grinding the opposite sides of the teeth and the grinding operation on these sides of the teeth is performed as before. The opposite sides of the pinion teeth may, however, be ground upon a separate machine.

The feed and withdrawal motions of the grinding wheel are effected in the machine shown in Fig. 21 by rotation of the nut 193 which produces an axial movement of the cradle 171 independent of, and it may be in addition to, the rotation of the cradle. The rotation of the nut 193 is produced by axial reciprocation of the worm 195. This worm is secured by a nut 220 (Fig. 22) to a sleeve 221 which carries a roller 222 that engages in the trackway 224 of a cam 225. The sleeve 221 is slotted at one side to permit the worm 195 to engage the worm wheel 194. The cam 225 is keyed to the same shaft 226 to which the crank 175 is secured. This shaft may be driven from any suitable source of power through the bevel gear 227.

The drive of the cradle 171 is not shown but may be through a worm wheel or a worm wheel segment in the conventional manner, in spiral bevel gear cutting or gear grinding machines.

The worm 195 is rotatably mounted in the reciprocable member 221 and a hand wheel 230 is provided to permit of hand adjustment of the axial position of the cradle to take up for wheel wear. This hand wheel has a clutch connection with the sleeve 221 and is secured in any suitable manner to the worm wheel shaft. A spline 231 is provided on the periphery of the sleeve 221 to hold this sleeve against rotation and guide it in its reciprocating movement under actuation of the cam 225.

Two different types of machines have been illustrated for practicing the present invention. It will be understood, however, that the invention is capable of still further modification. In the disclosed arrangements, machines are provided in which the axis of the grinding wheel is parallel to the cradle axis and no angular adjustment of the position of the grinding wheel is necessary. These machines are comparatively small, simple in construction and cheap and may be operated at very high speed because only a single cam-like connection is used between the work and cradle instead of a long train of gears. A desired form of tooth bearing can be very quickly obtained and the grinding wheel cost is very much reduced. Moreover the dressing mechanism is very simple and the dressing may be performed very rapidly for the clearance side of the wheel does not have to be dressed at all.

While various embodiments of the invention have been illustrated, it will be understood that the invention is capable of various further modifications and the present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of grinding a gear which comprises employing a rotary grinding wheel whose active grinding surface is inclined to the axis of the wheel at other than right angles and at a greater angle than the pressure angle of the tooth surfaces to be ground on the gear, and rotating said wheel in engagement with the gear while producing a relative rolling movement between the wheel and gear to generate the tooth profile and simultaneously effecting a further relative movement between the wheel and gear in time with the rolling movement to cause the tip of the wheel continuously to follow the root surface of the gear during the rolling movement.

2. The method of grinding a longitudinally curved tooth gear which comprises employing an annular grinding wheel that has an active grinding surface which is inclined to the axis of the wheel at an angle larger than the pressure angle of the tooth surfaces to be ground, and rotating said wheel in engagement with a gear to grind the length of a gear tooth while producing a relative rolling movement between the wheel and gear to generate the tooth profile and simultaneously effecting a further relative movement between the wheel and gear in time with the rolling movement to cause the tip of the wheel continuously to follow the root surface of the gear during the rolling movement.

3. The method of grinding a gear which comprises employing an annular grinding wheel that has an active grinding surface which is inclined to the axis of the wheel at an angle greater than the pressure angle of the tooth surfaces to be ground, and rotating said wheel in engagement with a gear to grind the length of a gear tooth while producing a relative rolling movement between the wheel and gear to generate the tooth profile and simultaneously effecting a further relative movement between the wheel and gear in time with the rolling movement in the direction of the axis about which the rolling movement takes place.

4. The method of grinding a gear which comprises employing an annular grinding wheel that has an active grinding surface which is inclined to the axis of the wheel at an angle greater than the pressure angle of the tooth surfaces to be ground, and rotating said wheel in engagement with a gear while producing a relative rolling movement between the wheel and gear about an axis parallel to the wheel axis to generate the tooth profiles and simultaneously effecting a further relative movement between the wheel and gear in time with the rolling movement and in the direction of the axis about which the rolling movement takes place.

5. The method of grinding a gear which comprises employing a rotary grinding wheel whose active surface has such a large inclination to the axis of the wheel that said active surface occupies substantially the whole width of the grinding portion of the wheel, rotating said wheel in engagement with a gear while producing a relative rolling movement between the wheel and gear to generate the tooth profiles and simultaneously effecting a further relative movement between the wheel and gear in time with the rolling movement to cause the tip of the wheel to follow continuously the root surface of the gear.

6. The method of grinding a gear which comprises employing a rotary grinding wheel whose active surface is inclined to the axis of the wheel at other than right angles and at an angle greater than the pressure angle of the tooth surfaces to be ground, positioning said wheel relative to the gear so that said active surface is inclined to the root plane of the gear at an angle equal to the pressure angle of the tooth surfaces to be ground, and rotating the wheel in engagement with the gear while rotating the gear on its axis and effecting a relative helicoidal movement between the wheel and gear in time with the gear rotation.

7. The method of grinding a gear which comprises employing an annular grinding wheel having an outwardly disposed grinding surface which is inclined to the axis of the wheel at an angle greater than the pressure angle of the tooth surfaces of the gear to be ground by said surface, positioning said wheel in engagement with the gear so that the tip surface of the wheel reaches inside the root plane of the gear, and rotating the wheel in engagement with the gear while producing a relative rolling movement between the wheel and gear to generate the tooth profiles and simultaneously effecting a further relative movement between the wheel and gear in time with the rolling movement to cause the tip of the wheel continuously to follow the root surface of the gear during the rolling movement.

8. The method of controlling the position of the tooth bearing on longitudinally curved tooth gears where one member of the pair has conical side tooth surfaces or tooth surfaces conjugate to conical surfaces, which comprises grinding each tooth surface of the other member of the pair with a grinding wheel having a grinding surface of curved profile in an axial plane, the curvature of which is determined by the position of the tooth bearing desired on the pair when they are in mesh, by rotating said wheel in engagement with the gear while producing a relative rolling movement between the wheel and gear through the angle of face advance of the gear teeth plus the additional angle required for the wheel to envelope and fully generate the profile of the tooth surface being ground.

9. A machine for grinding longitudinally curved tooth tapered gears comprising a tool support, a work support, a rotary grinding wheel journaled in the tool support, said wheel having an active grinding surface inclined at other than right angles to the axis of the wheel and at an angle greater than the pressure angle of the tooth surfaces to be ground, means for rotating the wheel on its axis, means for producing a relative rolling movement between the wheel and gear to generate the tooth profiles, and means for simultaneously effecting relative movement between the wheel and gear in the direction of the axis about which the relative rolling movement takes place.

10. A machine for grinding longitudinally curved tooth tapered gears comprising a tool support, a work support, an annular grinding wheel journaled in the tool support, a work spindle journaled in the work support, said wheel having an active grinding surface inclined to the wheel axis at an angle greater than the pressure angle of the tooth surfaces to be ground on the gear, an oscillatory cradle upon which one of said supports is mounted, said cradle having its axis parallel to the axis of the wheel, means for rotating the wheel on its axis, means for rotating the cradle on its axis, means for rotating the work spindle on its axis, and means for simultaneously producing a relative movement between the tool and work supports in the direction of the cradle axis.

11. A machine for grinding longitudinally curved tooth tapered gears comprising a tool support, a work support, an annular grinding wheel journaled in the tool support, a work spindle journaled in the work support, said wheel having an active grinding surface inclined to the wheel axis at an angle greater than the pressure angle of the tooth surfaces to be ground on the gear, an oscillatory cradle upon which one of said supports is mounted, said cradle having its axis parallel to the axis of the wheel, and a single means connecting the cradle to the work spindle during grinding to rotate the work spindle on oscillation of the cradle and simultaneously produce relative movement between the wheel and the work spindle in the direction of the axis of the cradle.

12. A machine for grinding longitudinally curved tooth tapered gears comprising a tool support, a work support, an annular grinding wheel journaled in the work support, a work spindle journaled in the work support, a cradle upon which one of said supports is mounted, said grinding wheel having an active surface whose inclination to the axis of the wheel is greater than the pressure angle of the tooth surfaces to be ground, said work support being mounted for sliding movement in the direction of the cradle axis, an abutment member secured to the cradle, a master cam connected to the work spindle and meshing with said abutment member, means for rotating the grinding wheel and means for rotating the cradle, said master cam and abutment being so formed as to impart both rotary movement to the work spindle and sliding movement to the work support on rotation of the cradle.

13. A machine for grinding longitudinally curved tooth gears comprising a tool support, a work support, an annular grinding wheel journaled in the tool support, a work spindle journaled in the work support, said grinding wheel having an active surface whose inclination to the axis of the wheel is greater than the pressure angle of the tooth surfaces to be ground, a cradle upon which one of said supports is mounted, means for rotating the cradle, means for rotating the work spindle upon rotation of the cradle, and means for moving the cradle axially on rotation thereof.

14. A machine for producing gears comprising a tool support, a work support, a cradle upon which one of said supports is mounted, means for rotating the cradle, means for rotating the work support upon rotation of the cradle, and means actuated by rotation of the cradle for moving the cradle axially.

15. A machine for producing gears comprising a tool support, a work support, an annular grinding wheel journaled in the tool support, a work spindle journaled in the work support, a rotary cradle upon which one of said supports is mounted, said grinding wheel having an active surface whose inclination to the axis of the wheel is greater than the pressure angle of the tooth surfaces to be ground, means connecting the cradle to the work spindle to rotate the work spindle on rotation of the cradle, a helical guide member secured to the cradle, a relatively fixed helical guide nut with which said guide member engages, means for rotating the wheel, and means for rotating the cradle.

16. A machine for producing gears comprising a tool support, a tool mounted thereon, a work support, a work spindle journaled in the work support, a cradle upon which one of said supports is mounted, an abutment having a fixed relation to the tool, a master cam connected to the work spindle, said abutment being in the form of a single tooth having side surfaces which are segments of surfaces of revolution, and said master cam being in the form of a tooth space whose side surfaces mesh with the side surfaces of the abutment member, and means for rotating the cradle to effect simultaneous rotation of the work spindle.

17. The method of grinding a gear which comprises employing an annular grinding wheel whose active surface is inclined to the axis of the wheel at other than right angles and at an angle greater than the pressure angle of the tooth surfaces to be ground, positioning said wheel relative to the gear so that said active surface is inclined to the root plane of the gear at an angle equal to the pressure angle of the tooth surfaces to be ground, and effecting a relative rolling movement between the wheel and gear to generate the tooth profiles while producing a relative movement between tool and gear in the direction of the axis about which said rolling motion takes place and in time with the rolling movement.

18. The method of grinding a gear which comprises employing an annular grinding wheel whose active surface is inclined to the axis of the wheel at other than right angles and at an angle greater than the pressure angle of the tooth surfaces to be ground, positioning said wheel relative to the gear so that its active surface is inclined to the root plane of the gear at an angle equal to the pressure angle of the tooth surfaces to be ground, and rotating the wheel in engagement with the gear while effecting a relative rolling movement between the wheel and gear about an axis parallel to the wheel axis to generate the tooth profiles and simultaneously producing a relative movement between the wheel and gear in time with the rolling movement and in the direction of the axis about which the rolling movement takes place.

19. The method of grinding a tapered gear which comprises employing a rotary grinding wheel which has an active grinding surface that is inclined to the axis of the wheel at other than right angles and at an angle greater than the pressure angle of the tooth surfaces to be ground, positioning said wheel so that its active surface is inclined to the root plane of the gear at an angle equal to the pressure angle of the tooth surfaces to be ground, and rotating said wheel in engagement with the gear while producing a relative rolling movement between the wheel and gear about an axis which is inclined to the gear axis and is offset from the apex of the gear to generate the tooth profiles while simultaneously effecting a relative movement between the wheel and gear in the direction of said offset axis.

20. The method of grinding a tapered gear which comprises employing a rotary grinding wheel which has an active grinding surface that is inclined to the axis of the wheel at other than right angles and at an angle greater than the pressure angle of the tooth surfaces to be ground, positioning said wheel so that its active surface is inclined to the root plane of the gear at an angle equal to the pressure angle of the tooth surfaces to be ground, and rotating the wheel in engagement with the gear while producing a relative rolling movement between the wheel and gear about an axis which is inclined to the gear axis and is offset from the axis of the gear to generate the tooth profiles and simultaneously effecting a relative movement between the wheel and gear in the direction of said offset axis.

21. The method of grinding a tapered gear which comprises employing a rotary grinding wheel which has an active grinding surface that is inclined to the axis of the wheel at other than right angles and at an angle greater than the pressure angle of the tooth surfaces to be ground, positioning said wheel so that its active surface is inclined to the root plane of the gear at an angle equal to the pressure angle of the tooth surfaces to be ground, and rotating the wheel in engagement with the gear while producing a relative rolling movement between the wheel and gear about an axis which is parallel to the axis of the wheel and which is offset from the apex of the gear to generate the tooth profiles and simultaneously effecting a relative movement between the wheel and gear in the direction of said offset axis.

22. In a machine for producing gears, a tool support, a tool mounted on the tool support, a work support, a work spindle journaled in the work support, a rotatable cradle on which one of said supports is mounted, a slide on which the other support is mounted, an abutment member having a fixed relation to the cradle, a master cam connected to the work spindle, said cam and abutment being so formed that on rotation of the cradle, rotation is imparted to the work spindle and simultaneously movement is imparted to the slide, means for actuating the tool, and means for rotating the cradle.

23. In a machine for producing gears, a tool support, a tool mounted on the tool support, a work support, a work spindle journaled in the work support, a rotatable cradle on which one of said supports is mounted, a slide movable in the direction of the axis of the cradle and on which the other support is mounted, an abutment member having a fixed relation to the cradle, a master cam connected to the work spindle, said cam and abutment being so formed that on rotation of the cradle, movement is imparted to said slide, means for actuating the tool, and means for rotating the cradle.

24. In a machine for producing gears, a tool support, an annular grinding wheel journaled in the tool support, said wheel having an active surface which is inclined to its axis at an angle greater than the pressure angle of the tooth surfaces to be ground, means for rotating the wheel, means for producing a relative rolling movement between the wheel and work, and means for simultaneously effecting a further relative movement between the wheel and work in time with the rolling movement to cause the tip of the wheel to follow the root surface of the work during said rolling movement.

25. A machine for producing gears comprising a tool support, a tool mounted thereon, a work support, a work spindle journaled in the work support, a cradle on which one of said supports is mounted, an abutment connected to the cradle, a master cam connected to the work spindle, said abutment and master cam being so formed as to produce rotational and sliding movement of the part to which one of them is connected on rotation of the part to which the other is connected, and means for rotating one of said parts.

26. A machine for producing gears comprising a tool support, a tool mounted thereon, a work support, a work spindle journaled in the work support, a cradle on which one of said supports is mounted, an abutment connected to the cradle, a master cam connected to the work spindle, said abutment being mounted coaxially of the cradle and being in the form of a single tooth space whose side surfaces are of convex profile shape and mesh with the side surfaces of the abutment and are so formed that when one of the parts to which either the abutment or the master cam is connected, is rotated, both a rotational and a sliding movement is imparted to the other part, and means for rotating one of said parts.

27. The method of controlling the position of the tooth bearing on longitudinally curved tooth gears where one member of the pair has conical side tooth surfaces or tooth surfaces conjugate to conical surfaces, which comprises grinding each tooth surface of the other member of the pair with a grinding wheel having a grinding surface of convex profile on an axial plane, the curvature of which is determined by the position of the tooth bearing desired on the pair when they are in mesh, by rotating said wheel in engagement with the gear while producing a relative rolling movement between the wheel and gear through the angle of face advance of the gear teeth plus the additional angle required for the wheel to envelope and fully generate the profile of the tooth surface being ground.

ERNEST WILDHABER.